(12) United States Patent
Shibata

(10) Patent No.: US 7,055,106 B2
(45) Date of Patent: May 30, 2006

(54) FILE MANAGEMENT METHOD

(75) Inventor: Koichi Shibata, Sakai (JP)

(73) Assignee: Minolta Co., Ltd., Osaka (JP)

( * ) Notice: Subject to any disclaimer, the term of this patent is extended or adjusted under 35 U.S.C. 154(b) by 554 days.

(21) Appl. No.: 10/161,644

(22) Filed: Jun. 5, 2002

(65) Prior Publication Data

US 2002/0186258 A1 Dec. 12, 2002

(30) Foreign Application Priority Data

Jun. 6, 2001 (JP) ............................. 2001-171143

(51) Int. Cl.
*G06F 19/00* (2006.01)
*G06F 17/50* (2006.01)

(52) U.S. Cl. ................... 715/837; 715/775; 715/839

(58) Field of Classification Search ................ 715/764, 715/784, 769, 765, 775, 810, 838, 839, 837
See application file for complete search history.

(56) References Cited

U.S. PATENT DOCUMENTS 5,751,287 A * 5/1998 Hahn et al. ................. 715/775
6,188,405 B1 * 2/2001 Czerwinski et al. ........ 715/764

FOREIGN PATENT DOCUMENTS

JP       A-2001-051987       2/2001

* cited by examiner

*Primary Examiner*—Cao (Kevin) Nguyen
(74) *Attorney, Agent, or Firm*—Buchanan Ingersoll PC

(57) ABSTRACT

A file management method prohibits a thumbnail image of an arbitrary file. The method displays files as thumbnail images on a display each of which show contents of the file, and detects a drag and drop operation between a specific thumbnail image and the arbitrary thumbnail image. The thumbnail image subject to the drag and drop operation is prohibited from displaying on the display.

15 Claims, 7 Drawing Sheets

Fig. 1
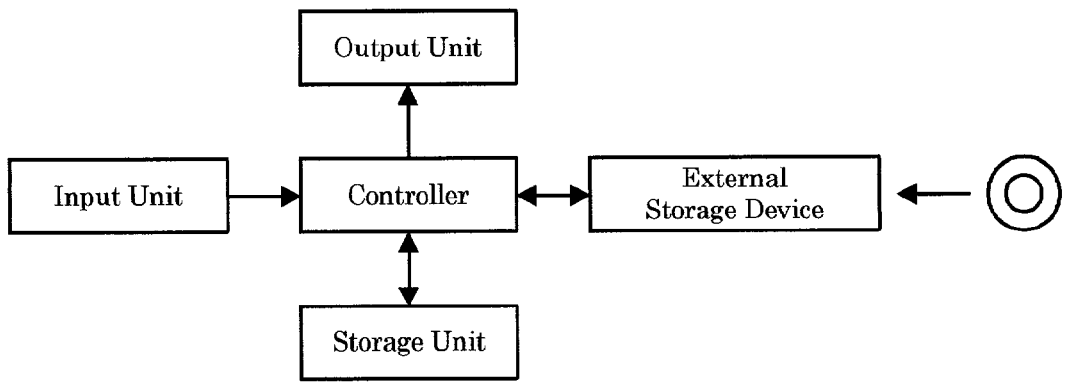
Fig. 2
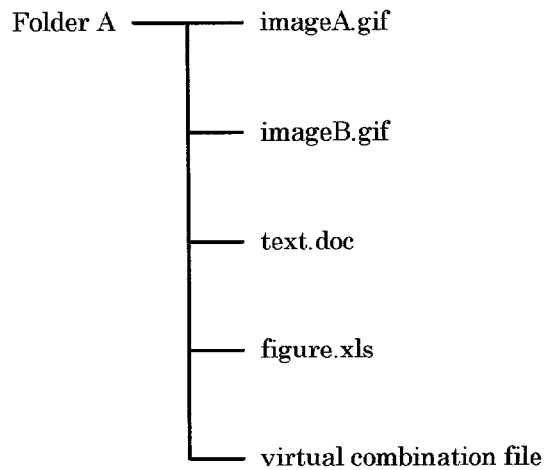
Fig. 3
| Order | File Names | Keywords | Comments |
|---|---|---|---|
| 1 | text.doc | sales, analysis | 2001 sales analysis results report |
| 2 | figure.xls | results, plan | graphs showing 2001 results and 2002 plan |

| Order | File Names | Keywords | Comments |
|---|---|---|---|
| 1 | Authorization Page | | |
| 2 | text.doc | sales, analysis | 2001 sales analysis results report |
| 3 | figure.xls | results, plan | graphs showing 2001 results and 2002 plan |

FILE MANAGEMENT METHOD

This application is based on Japanese Patent Application No. 2001-171143 filed in Japan on Jun. 6, 2001, the entire content of which is hereby incorporated by reference.

BACKGROUND OF THE INVENTION

1. Field of the Invention

The present invention pertains to a computer-based file management method.

2. Description of Related Art

As one type of computer-based file management system, a file management system has been proposed that displays thumbnail images (reduced images) of file contents as icons in order for the user to easily check the file contents. Because this file management system displays the contents of each file in a reduced size, the desired file can be identified more easily and reliably than when the file names and file preparation dates are referred to.

In addition, a system has been proposed (Japanese Laid-Open Patent Application 2001-51987) that, taking into consideration situations in which multiple users use one file management system, has a function to perform thumbnail display of the file contents and increase security. According to this system, thumbnail display is not available for files as to which the user does not wish to disclose the contents via thumbnail display, unless the correct authorization information is entered.

However, the method by which thumbnail display can be prohibited regarding such files has not been adequately considered.

OBJECTS AND SUMMARY

An object of the present invention is to provide a file management method that resolve the problem identified above.

Another object of the present invention is to provide a file management method by which the thumbnail display of any file can be prohibited via a simple operation.

These objects are attained by providing a file management method comprising of the steps of displaying files as thumbnail images on a display each of which show contents of the file; detecting a drag and drop operation is carried out between a specific thumbnail image and the other thumbnail image; and prohibiting the thumbnail image which the specific thumbnail image is dropped from being displayed on the display when the drag and drop operation is detected.

BRIEF DESCRIPTION OF THE DRAWINGS

These and other objects and features of the present invention will become clear from the following description taken in conjunction with the preferred embodiments thereof with reference to the accompanying drawings, in which:

FIG. 1 is a block diagram showing the basic construction of the file management system;

FIG. 2 is a drawing showing one example of the relationship between a folder and files;

FIG. 3 is a drawing showing one example of the construction of a virtual combination file;

DETAILED DESCRIPTION OF THE PREFERRED EMBODIMENTS

Figure 4:
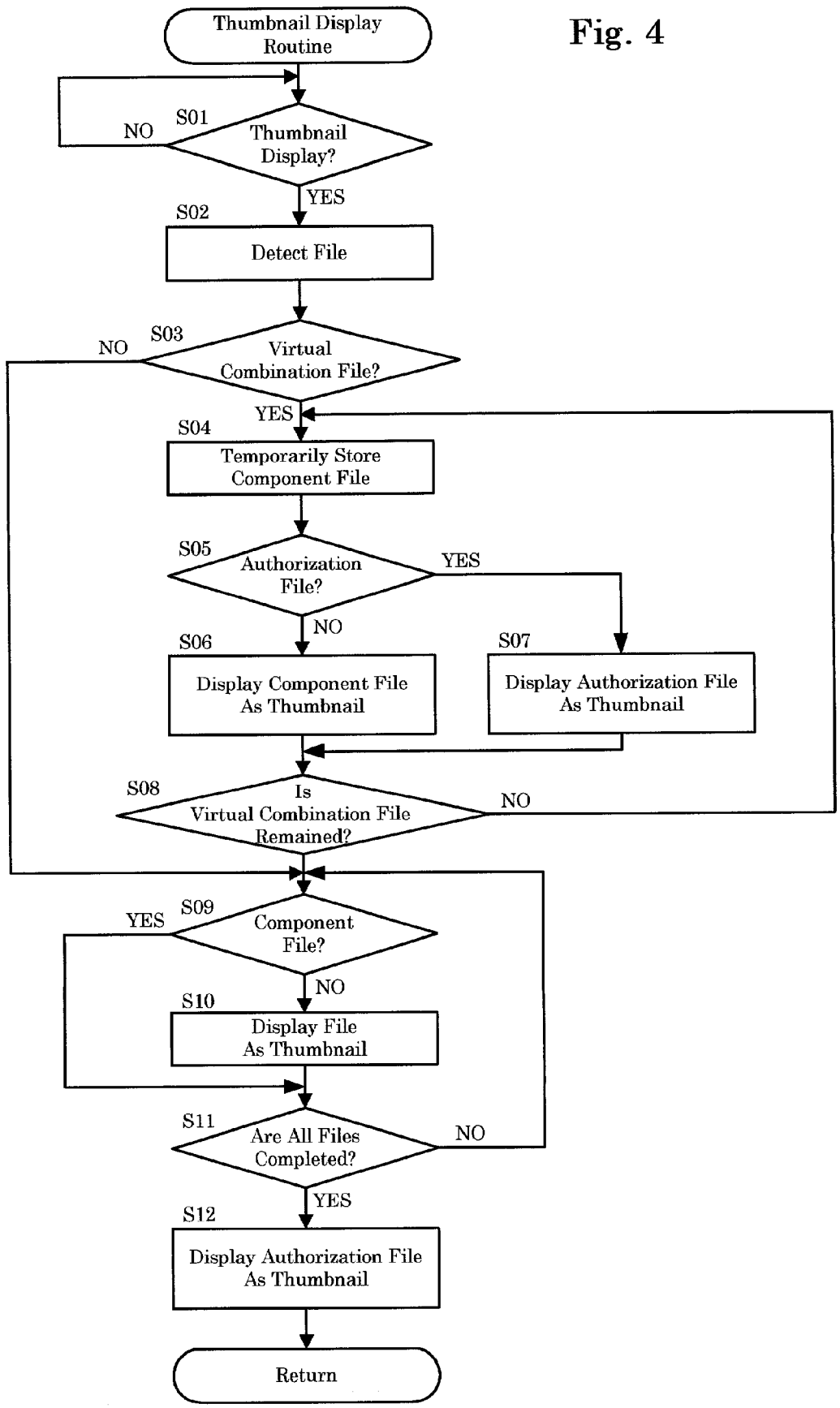
FIG. 4 is a flow chart showing the sequence of a thumbnail display routine.

An embodiment of the present invention is described below with reference to the drawings. In the drawing, identical numbers indicate identical or equivalent components, and explanations will not be duplicated.

FIG. 1 is a block diagram showing the basic construction of the file management system pertaining to one embodiment of the present invention. Referring to FIG. 1, the file management system 100 includes a controller 101 to control the entire file management system 100, an input unit 105 to input files, a storage unit 103 to store files, an output unit 107 to output files, and an external storage device 109 to store programs to be executed by the controller 101 as well as other data.

These components generally comprise a personal computer and various input/output devices, and in such a case, the operations of the controller 101 are executed via programs in the personal computer.

The input unit 105 is a keyboard or mouse, and enables input of characters, numbers or instruction commands.

The storage unit 103 stores document or image files. These files are, for example, files prepared using a word processing program, files prepared via a spreadsheet program, image files incorporated from a digital camera, image files read by an image scanner or other device, or files prepared via various other application programs.

The storage unit 103 also has multiple folders, such that various files are classified under each folder. Files may be stored under different folders depending on the application program used to prepare the file, such that, for example, one folder A stores files prepared via a word processing program, and another folder B stores files prepared via a spreadsheet program. Furthermore, files may be stored under different folders by subject matter, or folders may be created at certain intervals based on the dates on which the files were created. It is also possible to store the file management program in the storage unit 103.

The external storage device 109 reads the file management program and data files stored on an external recording medium 111, and sends them to the controller 101. It also writes the file management program and data files in the external recording medium 111 based on instructions from the controller 101.

For the external recording medium 111, a tape medium such as a magnetic tape or cassette tape, a disk medium such as a magnetic disk (floppy disk, hard disk device, etc.) or optical disk (CD-ROM, MO, MD, DVD, etc.), or a card medium such as an IC card (including a memory card) or optical card may be used. Naturally, the external recording medium 111 may also be constructed such that the file management program and data files are downloaded over the network.

The controller 101 can read the file management program recorded in the storage unit 103 or the external recording medium 111 for execution.

FIG. 2 is a drawing showing one example of the relationship between a folder stored in the storage unit 103 and files. FIG. 2 shows that there are five files stored in a certain folder A. Referring to FIG. 2, stored in the folder A are five files having the names 'imageA.gif', 'imageB.tif', 'text.doc', 'figures.xls' and 'virtual file A', respectively. Here, files having the extension 'gif' or 'tif' are image files, files with the extension 'doc' are files created using the word processing program Microsoft Word, and files with the extension 'xls' are files created using the spreadsheet program Microsoft Excel.

The file having the file name 'virtual file A' is a virtual combination file that is created in order to virtually combine multiple files. Virtual combination is a function by which to virtually handle multiple files as a single file. For example, files created via a word processing program can be combined with files of a different type, such as image files.

FIG. 3 is a drawing showing one example of the construction of a virtual combination file created in the file management system 100. FIG. 3 shows as an example a virtual combination file having the file name 'virtual file A'. Referring to FIG. 3, the virtual combination file has the items of 'order', 'file names', 'keywords' and 'comments'. A virtual combination file defines the files that are virtually combined (hereinafter 'component files') and the order thereof. The item 'file names' indicates the file names of the component files, and the item 'order' indicates the ordinal positions of the component files. Therefore, a virtual combination file must have at least the items 'order' and 'file names'. The virtual combination file shown in FIG. 3 shows that two files, i.e., 'text.doc' and 'figures.xls', are handled as a single file in the order of 'text.doc' and 'figures.xls'.

As described above, a virtual combination file includes the items 'keywords' and 'comments' in addition to 'order' and 'file names'. In the virtual combination file shown in FIG. 3, the keywords 'sales' and 'analysis' are associated with the component file 'text.doc' and a comment '2001 sales analysis results report' is added thereto. The keywords 'results' and 'plan' are associated with the component file 'figures.xls' and a comment 'graphs showing 2001 results and 2002 plan' is added thereto. By adding the item 'keywords' to the virtual combination file, desired search keys may be associated with each component file. In addition, by adding the item 'comments' to the virtual combination file, the contents of the component files can be easily understood. The items 'keywords' and 'comments' are not always necessary for a virtual combination file, however.

In this embodiment, a virtual combination file has the item 'order' such that the component files are defined via numbers that correspond to the ordinal positions of each of the component files, but these positions may be expressed via the relative positions of the component files. For example, the ordinal position of a file may be expressed in relation to the file immediately preceding it or to the file immediately following it.

A virtual combination file is created through execution of the file management program by the controller 101 in the file management system 100 as described above.

The process by which the contents of all files in a folder, including a virtual combination file, are displayed via thumbnail images will now be explained.

FIG. 4 is a flow chart showing the sequence of the thumbnail display routine executed in the file management system 100. Referring to FIG. 4, in the thumbnail display routine, it is first determined whether or not a command for thumbnail display has been received (step S01). Where a command for thumbnail display has been received, the controller 101 advances to step S02, and if not, a standby state is entered. Instead of maintaining the standby state when no thumbnail display command has been received, an interrupt may be generated when a thumbnail display command is received, such that the operations described below are carried out thereafter. Naturally, it is also acceptable if step S01 is eliminated and thumbnail display is made the default mode.

Here, thumbnail display is performed when a desired folder is designated. For the designation of a desired folder, the mouse or the keyboard of the input unit 105 of the file management system 100 is used.

When a folder is designated, all files that belong to that folder are detected (step S02). For example, where the folder A shown in FIG. 2 is designated, all of the five files including the virtual combination file are detected.

In the next step S03, it is determined whether or not a virtual combination file is included among the detected files, and if a virtual combination file is included, the controller 101 advances to step S04, but if not, the controller 101 advances to step S09. The determination as to whether or not a virtual combination file is included among the detected files is made based on the file names, for example. In this embodiment, a file name that does not include an extension is determined to represent a virtual combination file. It is also acceptable if the determination is made based on the file format or a dedicated extension that is added to virtual combination files.

In step S04, the file names of the component files included in the virtual combination file are temporarily stored. The stored component file names are read out in the step S09 described below. In step S05, it is determined whether or not an authorization file is included among the component files included in the virtual combination file. Where an authorization file is included, the controller 101 advances to step S07, and if not, the controller 101 advances to step S06. Here, an authorization file is a file having preset specific contents, and the details thereof are described below.

Where an authorization file is included as one of the component files, the contents thereof are displayed as a thumbnail image in step S07. Where no authorization files are included among the component files, the contents of the component file having an ordinal position of '1' is displayed as a thumbnail image in step S06. Subsequently, ti is determined in step S08 whether or not a virtual combination file regarding which thumbnail display processing, which was shown with reference to steps S04 through S07, has not been carried out still remains, and if such a file does remain, the controller 101 returns to step S04 and repeats the operation described above. If there are no more virtual combination files, the controller 101 advances to step S09. Where a file comprises multiple pages or images, the first page or image is first displayed as a thumbnail image.

Where it is determined in step S03 that there are no virtual combination files among the files detected in step S02, and where it is determined in step S08 that all virtual combination files have undergone the thumbnail display operation, it is determined in step S09 whether or not the target file is a component file that was stored in step S04. If the target file is determined to be a component file, the controller 101 advances to step S11, and if not, the controller 101 advances to step S11 after executing step S10. In step S10, the contents of the target file are displayed as a thumbnail image.

In step S11, it is determined whether or not the operations from step S03 through S10 have been completed for all files detected in step S02. If it is determined that such operations has been completed for all such files, the controller 101 advances to step S12, and if not, the controller 101 returns to step S09.

In step S12, the contents of the authorization file are displayed as a thumbnail image.

In the thumbnail display operation, component files included in a virtual combination file are not displayed as a thumbnail image in the process of step S10. The contents of the virtual combination file itself are also not displayed as a thumbnail image. In the thumbnail display operation, the contents of the authorization file are displayed in step S07 such that the multiple component files included in the virtual combination file are displayed as one thumbnail image or the contents of the component file having the ordinal position of '1' are displayed in step S06.

Figure 5:
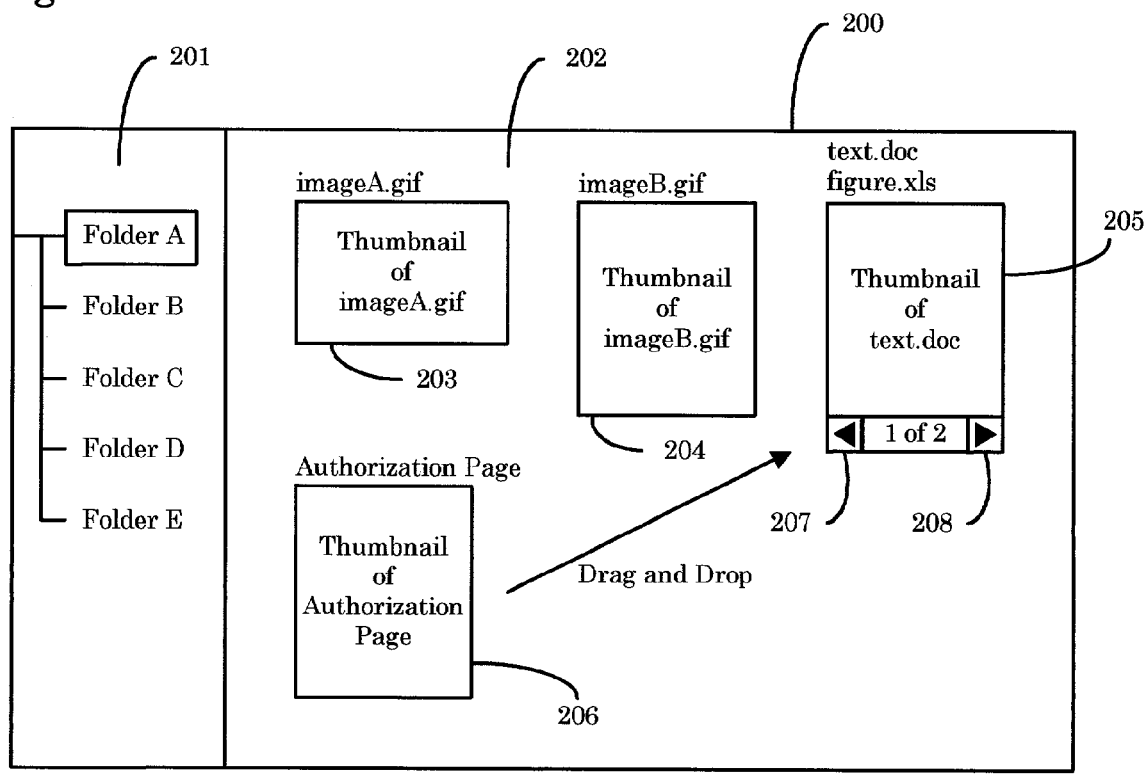
FIG. 5 is a drawing showing one example of a thumbnail display screen.

FIG. 5 is a drawing showing one example of the screen that is displayed when the thumbnail display operation is executed in the file management system 100. FIG. 5 shows a situation in which the folder A shown in FIG. 2 is designated. The arrow and the characters indicating 'drag and drop' in the drawing are added for the sake of explanation and do not actually exist on the screen.

Referring to FIG. 5, the screen 200 displayed when the thumbnail display operation is executed comprises an area 201 that shows [available] folders, as well as an area 202 in which are displayed as thumbnail images the contents of the files contained in the folder designated from among the folders displayed in the area 201. In FIG. 5, the situation in which the folder A is designated in the area 201 is shown via hatching.

Displayed in the area 202 are thumbnail images 203, 204 and 205 for the files contained in the folder A, as well as a thumbnail image 206 for the authorization file. A file name is displayed above each thumbnail image 203, 204, 205 and 206.

The thumbnail image 203 is a thumbnail image for the file 'imageA.gif', and the thumbnail image 204 is a thumbnail image for the file 'imageB.tif'.

The thumbnail image 205 is a thumbnail image for the virtual combination file 'virtual file A'. Above the thumbnail image 205 are displayed the file names 'text.doc' and 'figures.xls'. Because multiple file names are displayed in this way, it can be determined that the thumbnail image 205 represents a virtual combination file. In addition, below the thumbnail image 205 are displayed page backward and forward buttons 207 and 208 as well as an area therebetween that shows the page number. Here, '1 of 2' is displayed in the area that shows the page number. This indicates that the contents of the first page of a total of two pages are being displayed as the thumbnail image 205. These page backward and forward buttons and the page number area are also displayed where other files that are not virtual combination files include multiple pages or images.

When the buttons 207 or 208 are pressed using a pointing device such as a mouse, the thumbnail for the previous or next page or image can be displayed. When the page forward button 208 is pressed using a pointing device, the thumbnail image 205 is switched to display the contents of the next page. When this occurs, the page number area below the thumbnail image 205 displays '2 of 2', indicating that the contents of the second page of a total of two pages are being displayed as the thumbnail image 205. When the page backward button 207 is pressed, the thumbnail image 205 is switched to display the contents of the previous page.

The thumbnail image 206 displays the contents of the authorization file in reduced size. The file name of the authorization file is 'authorization page'. The authorization file is stored in a prescribed area of the storage unit 103. The contents of the file are not restricted in any particular fashion, so long as it can be seen that the file is an authorization file. Here, it is deemed an image file that displays the characters 'For authorization'. The authorization file may be stored in each folder.

While the folder A shown in FIG. 2 contains five files including a virtual combination file, thumbnail images for only three of them are displayed in the area 200. This is because the virtual combination file includes two files as component files, i.e., 'text.doc' and 'figures.xls', and these two files are not displayed separately as thumbnail images.

Figure 6:
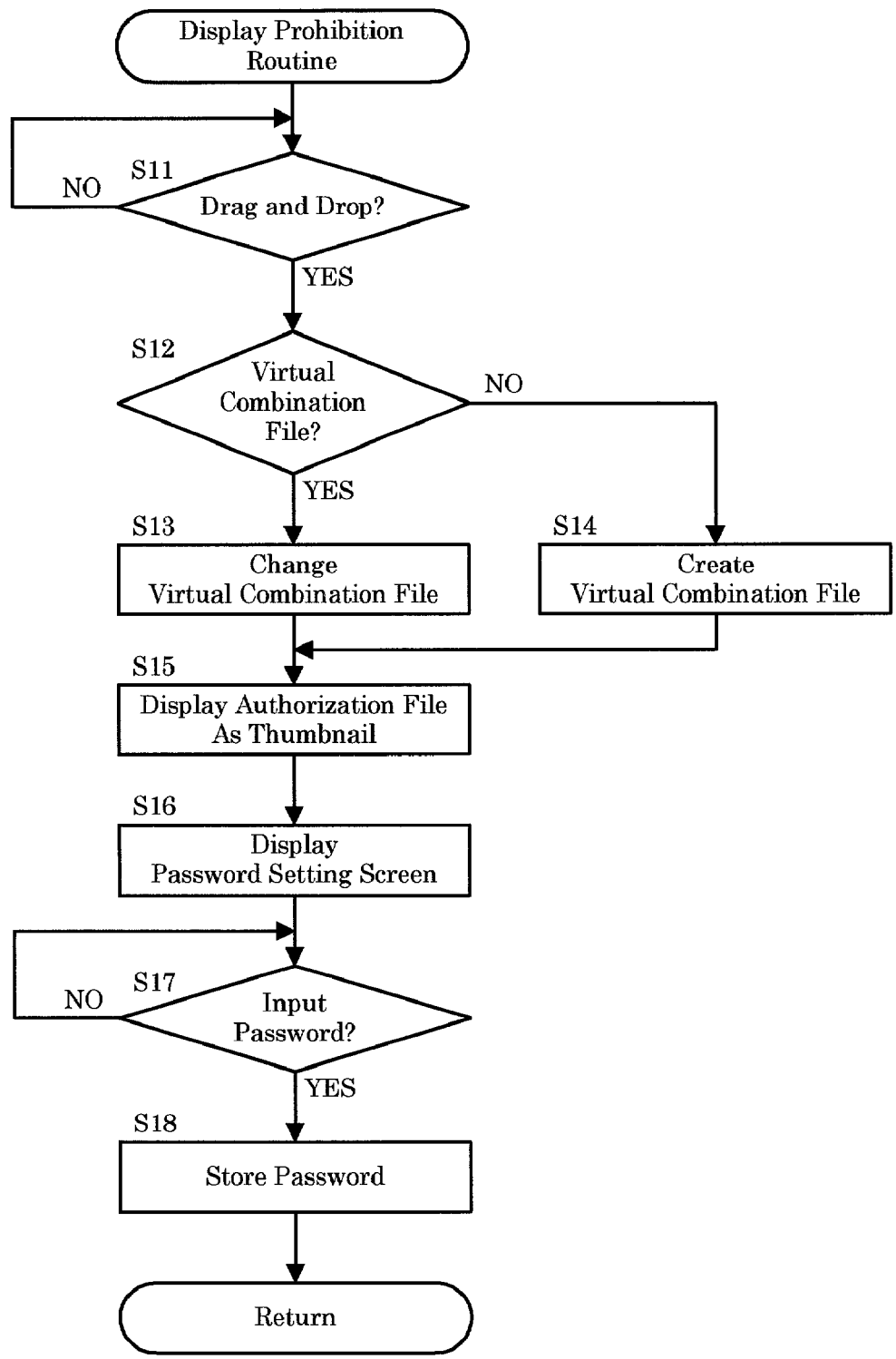
FIG. 6 is a flow chart showing the sequence of a thumbnail display prohibition routine.

The display prohibition operation by which thumbnail display of file contents is prohibited will now be explained. FIG. 6 is a flow chart showing the sequence of the display prohibition routine executed in the file management system 100.

Referring to FIG. 6, in the display prohibition operation, it is first determined whether or not the thumbnail image for the authorization file has been dragged and dropped onto another thumbnail image (step S11). For example, in the situation in which the screen shown in FIG. 5 is being displayed, it is determined whether or not the thumbnail image 206 for the authorization file has been dragged and dropped onto any of the thumbnail images 203, 204 and 208 using a pointing device. In other words, where the thumbnail image 206 for the authorization file has been dragged and dropped onto another thumbnail image, the controller 101 advances to step S12, and if not, the standby state is entered. It is also acceptable if the standby state is not entered, an interrupt is generated when the drag and drop takes place, and the following operation is executed. In addition, it is also acceptable if the following operation is carried out when a file the thumbnail display for which is desired to be prohibited is dragged and dropped onto the thumbnail image 206 for the authorization file.

In step S12, it is determined whether or not the thumbnail image onto which the thumbnail image 206 for the authorization file was dropped is a thumbnail image for a virtual combination file (step S12). If it is a thumbnail image for a virtual combination file, the controller 101 advances to step S13, and if not, the controller 101 advances to step S14.

In step S13, the contents of the virtual combination file are changed. In the case of the screen shown in FIG. 5, step S13 is performed when the thumbnail image 206 is dragged and dropped onto the thumbnail image 205. Changing the contents of a virtual combination file is an operation in which the authorization file is added thereto as a component file having the ordinal position of '1'.

Figures 7, 8:
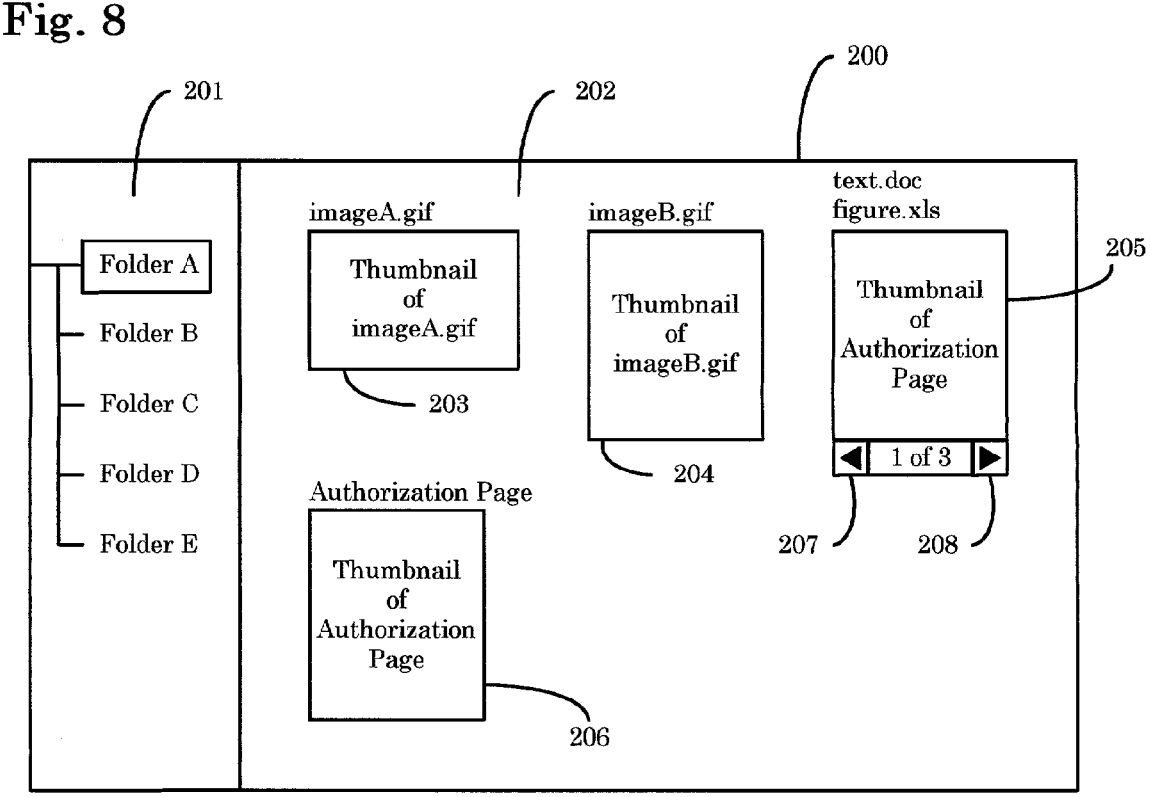
FIG. 7 is a drawing showing one example of the components of a virtual combination file regarding which thumbnail display is prohibited.
FIG. 8 is a drawing showing one example of the screen that is displayed after thumbnail display prohibition.

FIG. 7 is a drawing showing one example of the contents of a virtual combination file the contents of which have been changed via the execution of the display prohibition operation in the file management system 100. FIG. 7 shows an example in which step S13 of FIG. 6 has been executed with regard to the virtual combination file shown in FIG. 3. Referring to FIG. 7, the 'authorization page' file has been added as a file having the ordinal position of '1'. The ordinal position of 'text.doc' has been pushed down by 1 to '2'. Similarly, the ordinal position of 'figures.xls' has been pushed down by 1 to '3'.

The authorization file is added with the ordinal position of '1' in this way as a component file of the virtual combination file 'virtual file A'.

On the other hand, a new virtual combination file is created in step S14. The controller 101 advances to step S14 when the thumbnail image for the authorization file has been dropped onto a file that is not a virtual combination file. For example, using the screen shown in FIG. 5 as an example, such screen shows a situation in which the thumbnail image 206 is dropped onto the thumbnail image 203 or the thumbnail image 204. In such a case, a new virtual combination file is created in order to associate the file with the authorization file.

A virtual combination file that is newly created here will be explained using a situation in which the thumbnail image 206 is dragged and dropped onto the thumbnail image 203. The authorization file is assigned to the virtual combination file as a component file having the ordinal position of '1', and 'imageA.gif', which corresponds to the thumbnail 203, is assigned as a component file having the ordinal position of '2'. A new virtual combination file is thus created.

Next, the contents of the authorization file are displayed as a thumbnail image in step S15. Therefore, where the thumbnail image 206 has been dragged and dropped onto the thumbnail image 205, the thumbnail image 205 is changed to reflect the contents of the authorization file. In other words, the thumbnail image that was displaying the contents of the virtual combination file (specifically, the contents of the component file having the ordinal position of '1', i.e., 'text.doc') with a thumbnail that displays the contents of the authorization file. This is equivalent to prohibiting the contents of the virtual combination file from being displayed as a thumbnail image.

FIG. 8 is a drawing showing one example of the screen that is displayed when the display prohibition operation is executed in the file management system 100. FIG. 8 shows a situation in which the thumbnail image 206 has been dragged and dropped onto the thumbnail image 205 in the screen shown in FIG. 5. In comparison with FIG. 5, in FIG. 8, the thumbnail image 205 that was displaying the contents of 'text.doc.' has been replaced with a thumbnail image that displays the contents of the authorization file.

Figure 9:
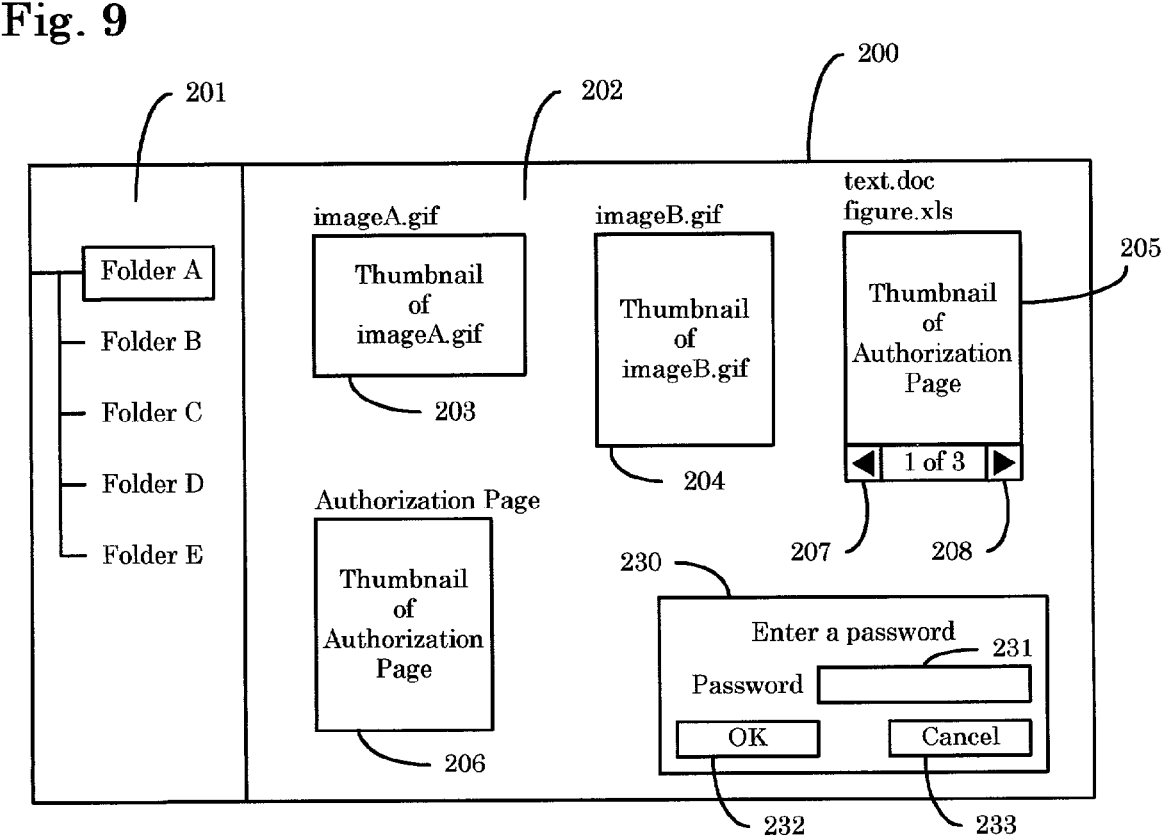
FIG. 9 is a drawing showing one example of the screen by which to accept an entered password.

Returning to FIG. 6, in step S16 after the contents of the authorization file is displayed as a thumbnail in step S15, a password setting screen is displayed. FIG. 9 is a drawing showing one example of the password setting screen. Referring to FIG. 9, a password setting screen 230 is displayed in the area 202 of the screen 220. Displayed in the password setting screen 230 are the comment 'Enter a password', as well as an area 231 in which to input a password, an OK button 232 and a cancel button 233.

The area 231 is an area in which a password can be entered using a keyboard or similar means. The OK button 232 is a button that is pressed when input of a password in the area 231 is completed. The cancel button 233 is a button that is pressed to stop input of a password, for example. The OK button 232 and the cancel button 233 are pressed using a pointing device or a keyboard. When the OK button 232 is pressed after a password is entered in the area 231, that password is accepted. On the other hand, where the cancel button 233 is pressed, no passwords is deemed have been entered regardless of whether a password had been entered in the area 231.

Returning to FIG. 6, after the password setting screen 230 is displayed in step S16, it is determined in the next step S17 whether or not a password has been entered. Where a password has been entered, the controller 101 advances to step S18, and if no passwords have been entered, the controller 101 returns to step S16. In step S18, the input password is stored. This password is stored while being associated with the virtual combination file. It is also acceptable if the operations from step S16 through step S18 are eliminated, and a single common password is established for the file management system 100. In this case, it becomes no longer necessary to set an individual password for each file the display of which is to be prohibited.

Figure 10:
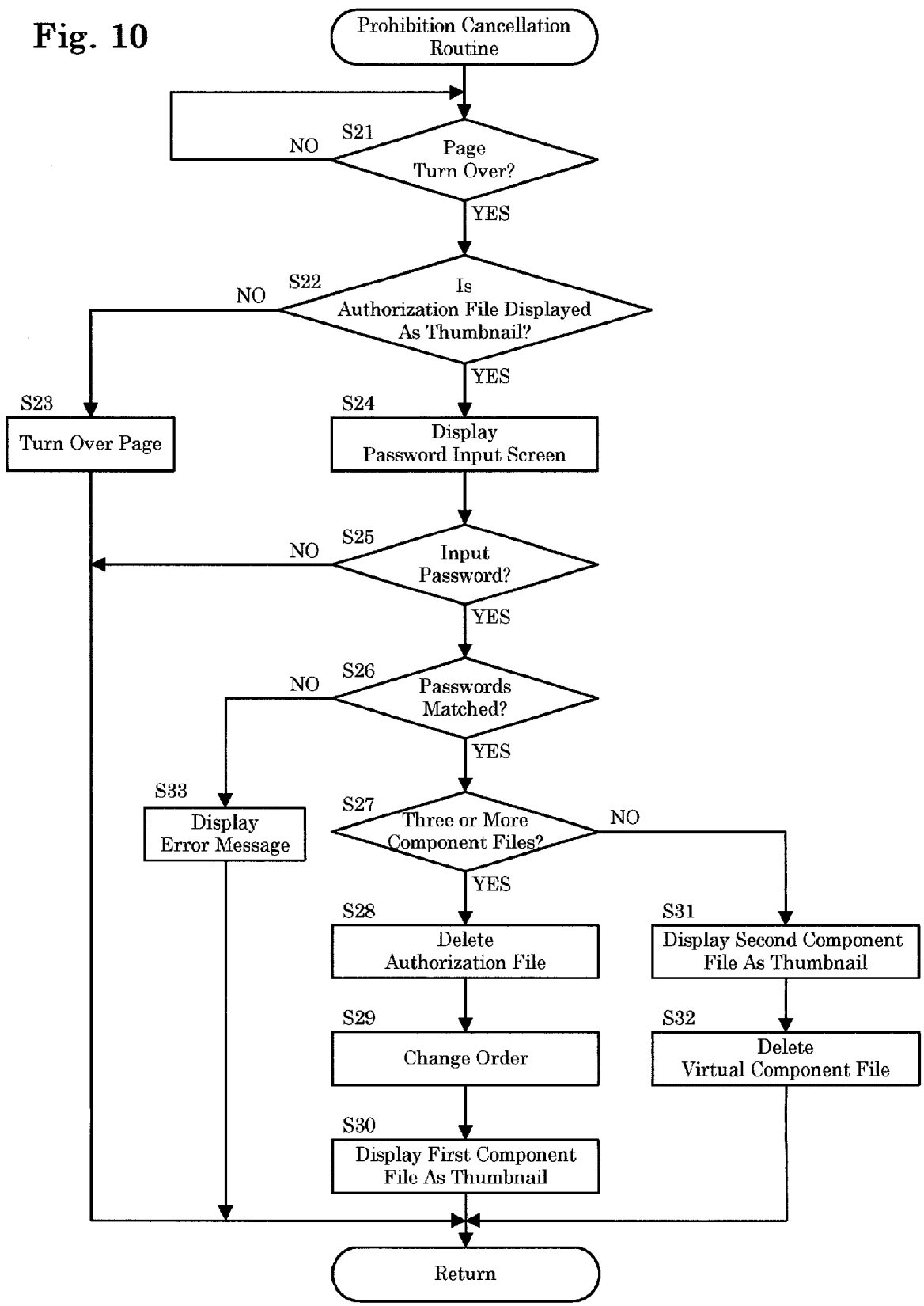
FIG. 10 is a flow chart showing the sequence of a thumbnail display prohibition cancellation routine.

FIG. 10 is a flow chart showing the sequence of the display prohibition cancellation routine executed in the file management system 100. Referring to FIG. 10, in the display prohibition cancellation routine, it is first determined whether or not a page backward command or page forward command regarding a thumbnail image has been input (step S21). It is determined that a page backward or page forward command has been input by detecting that the page backward button 207 or page forward button 208 has been operated using a pointing device. Where a thumbnail page backward or page forward command has been input, the controller 101 advances to step S22, and if not, the standby state is entered. Instead entering a standby state, an interrupt may be generated when a page backward or page forward command is input such that the following operation is thereafter executed.

In step S22, it is determined whether or not the thumbnail image regarding which the page backward or page forward command was input is displaying the contents of the authorization file. If the contents of the authorization file are being displayed, the controller 101 advances to step S24, and if not, the controller 101 advances to step S23.

In step S23, the page backward or page forward operation is performed. Where the thumbnail image is not displaying the contents of the authorization file, that means that the display of the file is not prohibited, and therefore, a page backward or page forward operation is performed for such a file, and the contents of the previous or next page are displayed as a thumbnail image. The routine is then ended.

A YES determination in step S22 means that an authorization file is assigned as the component file having the first ordinal position in a virtual combination file. In addition, a virtual combination file that contains an authorization file is a file the display of which has been prohibited via the display prohibition operation described above. Consequently, in step S24, a password input screen is displayed without the performance of a page backward or page forward operation. Because the password input screen and the operation thereof are identical to those shown in FIG. 9, their explanation will not be repeated.

After the password input screen 250 is displayed in step S24, it is determined whether or not a password has been entered (step S25). Where a password has been entered, the controller 101 advances to step S26, and if not, the controller 101 ends the routine.

In step S26, the entered password is checked against the stored password associated with the virtual combination file, and if the passwords match, the controller 101 advances to step S27, and if not, the controller 101 advances to step S33.

In step S27, it is determined whether or not three or more component files exist in the virtual combination file regarding which a page backward or page forward command was input. If there are three or more files, the controller 101 advances to step S28, and if not, the controller 101 advances to step S31.

In step S28, an operation is performed in which the authorization file is deleted from among the component files of the virtual combination file. In step S29, the order of the remaining component files is changed such that the ordinal position of each component file is pushed up by 1. Consequently, the virtual combination file regarding which the display prohibition operation shown in FIG. 7 was performed is changed into a regular virtual combination file shown in FIG. 3.

In step S30, the contents of the component file having the ordinal position '1' in the virtual combination file regarding which the order of the component files thereof was changed are displayed as a thumbnail image. Consequently, the screen 210 shown in FIG. 8 is changed to the screen 200 shown in FIG. 5. The thumbnail image 205 then becomes a thumbnail image that displays the contents of 'text.doc'.

On the other hand, where it is determined in step S27 that the number of component files is not three or more (i.e., where it is determined that the number of component files is two), the contents of the component file having an ordinal position of '2' in the virtual combination file are displayed as a thumbnail image in step S31. The virtual combination file is then deleted in step S32. In other words, where there is one remaining component file as a result of the deletion of the authorization file from among the component files, it is no longer necessary to keep the virtual combination file. Therefore, the virtual combination file is deleted. At the same time, where the entered password does not match the stored password in step S26, an error message is displayed in step S33 and the routine is ended.

As described above, in the file management system, the contents of a file can be prohibited from display via the simple operation of dragging and dropping the thumbnail image for an authorization file onto the thumbnail image for a file that the user does not want to be displayed.

In addition, because the contents of the authorization file are displayed as a thumbnail image instead of the thumbnail image for the file that was prohibited from display, the existence of the file that is prohibited from display can be verified.

Furthermore, because a password is used in order to cancel the display prohibition regarding the file that was previously prohibited from display, security can be ensured and display prohibition can be easily cancelled.

In the embodiment described above, an example in which only one authorization file is used was shown, but the number of authorization files that maybe used is not limited to one, and multiple such files may be used instead. In this case, a different password may be assigned to each of the multiple authorization files. In other words, the authorization files may have mutually different passwords. Alternatively, a single common password may be used for the different authorization files.

Furthermore, in the embodiment described above, an example was shown in which when thumbnail display of the contents of a file are desired to be prohibited, the thumbnail image for the file are dragged and dropped onto the thumbnail image 206 for the authorization file, but instead of the dragging and dropping onto the thumbnail image 206 for the authorization file, a certain button or area in the screen shown in FIG. 5 may be established to represent the drag and drop operation.

A file management system was described in this embodiment, but needless to say, the present invention may be interpreted as a file management method that executes the operations shown in FIGS. 4, 6 and 10, and as a file management program that causes a computer to execute these operations. Such file management program can be recorded on a recording medium 111, such that the file management program recorded on the recording medium 111 is read by the external storage device 109 and transmitted to the controller 101. The controller 101 is enabled to carry out the operations shown in FIGS. 4, 6 and 10 through execution of the read file management program.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A file management method in a computer system comprising the steps of:
    displaying on a display an authorization file as a specific thumbnail image;
    displaying files as thumbnail images on the display, each thumbnail image showing actual contents of the file, wherein said files include at least one of document files and image files;
    detecting a drag and drop operation is carried out, in which the specific thumbnail image is dragged and dropped onto the other thumbnail image; and
    prohibiting showing contents of the file, on which the specific thumbnail image is dropped, from being displayed on the display when the drag and drop operation is detected.

2. A file management method as claimed in claim 1, further comprising the step of creating a virtual combination file which combines the specific file and the file whose thumbnail image is subject to the drag and drop operation when the drag and drop operation is detected.

3. A file management method as claimed in claim 2, wherein the displaying step displaying the contents of the specific file as a thumbnail image of the virtual combination file.

4. A file management method as claimed in claim 2, further comprising the step of prompting a user to input a password when the drag and drop operation is detected.

5. A file management method as claimed in claim 4, further comprising the step of asking a user about the password before releasing the thumbnail image prohibiting operation.

6. A file management method as claimed in claim 5, further comprising the step of deleting the specific file from the virtual combination file when the passwords are matched.

7. A file management method in a computer system comprising the steps of:
    displaying on a display an authorization file as a specific thumbnail image;
    displaying files as thumbnail images on the display, each thumbnail image showing actual contents of the file, wherein said files include at least one of document files and image files;
    detecting a drag and drop operation is carried out, in which an arbitrary thumbnail image is dragged and dropped onto the specific thumbnail image; and
    prohibiting showing contents of file dropped on the specific thumbnail image from being displayed on the display when the drag and drop operation is detected.

8. A file management method as claimed in claim 7, further comprising the step of creating a virtual combination file which combines the specific file and the file whose thumbnail image is subject to the drag and drop operation when the drag and drop operation is detected.

9. A file management method as claimed in claim 7, wherein the displaying step displaying the contents of the specific file as a thumbnail image of the virtual combination file.

10. A file management method in a computer system comprising the steps of:

displaying files as thumbnail images on a display, each thumbnail image showing actual contents of the file, said files including at least one of document files and image files and a virtual combination file which combines plural files as component files;

detecting whether the virtual combination file includes a specific file for authorization; and prohibiting showing contents of the component files, other than the specific file, from displaying on the display when the virtual combination file includes the specific file.

11. A file management method as claimed in claim 10, wherein the displaying step displays a thumbnail image of the specific file for the virtual combination file including the specific file.

12. A file management method as claimed in claim 10, further comprising the step of creating a virtual combination file by a drag and drop operation between files.

13. A file management method as claimed in claim 12, further comprising the step of prompting a user to input a password when the drag and drop operation is carried out.

14. A file management method as claimed in claim 13, further comprising the step of asking a user about the password before releasing the thumbnail image prohibiting operation.

15. A file management method as claimed in claim 14, further comprising the step of deleting the specific file from the virtual combination file when the passwords are matched.

* * * * *